United States Patent [19]

Wabeeke et al.

[11] Patent Number: 5,674,972
[45] Date of Patent: Oct. 7, 1997

[54] POLYAMIDE-BASED FORMULATIONS

[75] Inventors: Luc Van Wabeeke, Overyse; Daniel De Schryver, Bonheiden, both of Belgium

[73] Assignee: Albemarle Corporation, Richmond, Va.

[21] Appl. No.: 508,281

[22] Filed: Jul. 27, 1995

[51] Int. Cl.$^6$ ................ C08G 69/00; C08K 3/22
[52] U.S. Cl. ............. 528/310; 524/341; 524/371; 524/373; 524/409; 524/412; 524/467; 524/469; 524/494; 525/183; 525/185; 525/420
[58] Field of Search .............. 528/310; 524/371, 524/341, 373, 467, 469, 412, 409, 494; 525/183, 185, 420

[56] References Cited

U.S. PATENT DOCUMENTS

| | | | |
|---|---|---|---|
| 4,360,616 | 11/1982 | Pagilagan | 524/100 |
| 4,373,049 | 2/1983 | Richardson | 524/375 |
| 4,410,653 | 10/1983 | Kohan | 524/371 |
| 4,447,572 | 5/1984 | Scharf et al. | 524/371 |
| 4,981,890 | 1/1991 | Schleifstein | 524/371 |
| 5,053,447 | 10/1991 | Hussain | 524/412 |
| 5,115,010 | 5/1992 | Sakai et al. | 524/410 |

*Primary Examiner*—Samuel A. Acquah
*Assistant Examiner*—P. Hampton-Hightower
*Attorney, Agent, or Firm*—Edgar E. Spielman, Jr.

[57] ABSTRACT

This invention relates to polyamide-based formulations flame retarded with synergized brominated flame retardants and having good thermal stability.

9 Claims, No Drawings

POLYAMIDE-BASED FORMULATIONS

BACKGROUND OF THE INVENTION

This invention relates to flame retarded, thermally stable polyamide-based formulations. These formulations have favorable processing and in-use characteristics.

Two of the most commercially significant polyamides are poly(hexamethyleneadipamide) and polycaprolactam. These polyamides are commonly referred to, respectively, as nylon 6,6 and nylon 6. Generally, polyamides are injection molded or extruded to form the desired article. Processing polyamides is not without difficulty as polyamides do not have especially good melt-flow characteristics. This is especially true for polyamide formulations which incorporate reinforcing materials, e.g., glass fibers and the like. Poor melt-flow characteristics make the formation of complex and intricate shapes difficult and adversely impact molding efficiency. The molder can obtain some benefit by raising the processing temperature.

In many applications, the market requires that articles made from polyamides have a flame retardant quality. Polyamides can be rendered flame retardant by the use of a combination of a brominated flame retardant and an $Sb_2O_3$ flame retardant synergist. While such a combination provides flame retardancy, it, unfortunately, is also linked to the degradation of the polyamide polymer when the processing temperature begins to approach those temperatures which are needed to obtain good melt flows, e.g., temperatures between 320° and 330° C. The degradation is believed to be the result of an antagonism between the $Sb_2O_3$ synergist and the brominated flame retardant (the antagonism is believed to cause the production of hydrogen halide, which in turn attacks the polyamide polymer chains causing their scission and ultimate polymer degradation). Removing the $Sb_2O_3$ synergist from the system is not an acceptable answer as without the synergist, the amount of flame retardant needed can be so high that the physical attributes of articles produced from the polyamide polymer can be quite poor. Other antimony based synergists are suggested by the prior art for use with various brominated flame retardants; however, the prior art does not teach any reason to expect that any of these other synergist will not be antagonistic in combination with brominated flame retardants in polyamide-based formulations.

It is therefore an object of this invention to provide for a polyamide-based formulation which has good flame retardancy and which can be processed at higher temperatures without experiencing polymer degradation. It is also an object of this invention to provide for articles produced from such formulations. It is a further object of this invention to provide for a process for enhancing the thermal stability of polyamide-based formulations containing a brominated flame retardant and an antimony-based synergist.

THE INVENTION

This invention relates to polyamide-based formulations which comprise: (i) at least about 50 wt % polyamide; (ii) a flame retarding amount of brominated flame retardant having a melting point in excess of 300° C.; and (iii) a synergistic amount of $M_2OSb_2O_3$, wherein M is an alkali metal radical.

In addition, formulations of this invention may comprise: (i) at least about 50 wt % polyamide; (ii) a flame retarding amount of brominated flame retardant having a melting point in excess of 300° C.; (iii) a synergistic amount of $M_2OSb_2O_3$, wherein M is an alkali metal radical; and (iv) a thermally stabilizing amount of hydrotalcite.

It has been discovered that by using the antimony synergist, $M_2OSb_2O_3$, instead of $Sb_2O3$, the antagonism experienced at the higher processing temperatures between the brominated flame retardant and the antimony synergist is attenuated. Thus, for this reason alone, the molder, by using a formulation of this invention, will be able to use processing temperatures in excess of that which can be used with $Sb_2O_3$. In addition, the antimonate synergist operates just as the $Sb_2O_3$ synergist does in that it allows for the amount of brominated flame retardant to be kept low.

Further, it has been discovered that even higher processing temperatures can be used if the formulations of this invention additionally contain hydrotalcite. Hydrotalcite has been found to be especially beneficial since its presence in the formulation does not adversely impact the flame retardancy of articles produced from the formulation.

Both unreinforced and reinforced polyamides are suitable for the purposes of this invention. The preferred polyamides are nylon 6, nylon 6,6 and mixtures thereof. The most preferred polyamide-based formulations use a mixture of nylon 6 and nylon 6,6 wherein the former constitutes from about 95 to about 5 wt % of the mixture. Preferably, the nylon 6 will constitute from about 50 to about 10 wt % of the mixture. Other preferred polyamides are those which are commercially available. The processes for the preparation of and a description of the properties of various polyamides are described in the *Encyclopedia of Polymer Science and Technology*, Vol. 10, pages 553–569, Interscience Publishers, New York, N.Y., and in *Kirk-Othmer Encyclopedia of Chemical Technology*, 3rd Edition, Vol. 18, pages 405–425, John Wiley & Sons, Inc., both of which are incorporated herein as if fully set forth.

When the formulations of this invention utilize reinforced polyamides, the reinforcing material is generally glass fibers. These fibers will constitute from about 5 to about 50 wt % of the total weight of the glass and polyamide. Most preferably, the glass will constitute from about 25 to about 40 wt % of the total weight. Even more preferred, is a glass content of 30 to 35 wt %. The glass fibers may be any type of glass and of any length which is commonly used in reinforcing polyamides. Glass reinforced nylon 6,6 can be obtained commercially, e.g., Vydyne R R533 (Monsanto Chemical Company), Zytel R 70G33L (E.I. DuPont De Nemours and Company), Wellamid R GF33-66XE-N (Wellman Inc.), Akulon 5223-G6Nat (Akzo) and the like. Glass reinforced nylon 6 is also commercially available, e.g., Nycoa R 1379 (Nylon Coroporation), Dexlon R 633HI (Dexter Plastics Division of Dexter Corporation, and Dexlon R 633 (Dexter Plastics Division of Dexter Corporation).

The polyamides will comprise at least 50 wt % and preferably from about 60 to about 85 wt % of the total formulation weight. Most preferably, the polyamide will comprise from about 75 to about 85 wt % of the total formulation weight.

The brominated flame retardant will generally be an aromatically brominated flame retardant. Exemplary of suitable brominated flame retardants are: decabromodiphenyl oxide; decabromodiphenyl ethane; decabromodiphenyl methane; hexabromodixylyl ethane; octabromoditolyl ethane; N, N'-ethylene bis(tetrabromophthalimide); N, N'-bis(tetrabromophthalimide); tetradecabromodiphenoxybenzene; brominated 1,1,3-trimethyl-3phenyl indan; brominated 1-methyl-3-phenyl indan; and mixtures of any two or more of the foregoing. The most preferred flame retardants are decabromodiphenyl oxide and decabromodiphenyl ethane. The latter is most highly preferred.

The amount of flame retardant used in the subject formulations is that amount which will provide the acceptable level of flame retardancy sought by the molder considering the presence of the flame retardant synergist in the formulation. The level of flame retardancy is quantifiable. An accepted method for quantification is that method set out by The Under-writer Laboratories Inc. in a test denominated as UL 94 and entitled "Tests for Flammability of Plastic Materials for Parts in Devices and Appliances". The UL 94 ratings are V-0, V-1, V-2 and fail. The highest flame retardancy is given by the V-0 rating. In some applications, a UL-94 flame retardancy rating of V-0 is required while in other applications the lower V-2 rating is acceptable. Thus, the amount of flame retardant used by the molder will be in compliance with his perceived needs. Generally, for a rating other than "fail", the amount of flame retardant will lie within the range of from about 12 to about 25 wt % of the total weight of the formulation. It is most preferred that when the flame retardant is decabromodiphenyl ethane, that it be present in an amount which is within the range of from about 14 to about 20 wt %, and most highly preferred that it be present in an amount which is within the range of from about 16 to about 18 wt %. Amounts of flame retardant which are in excess of the upper ends of the ranges given above may be acceptable from a flame retardancy standpoint, but the physical properties of an article containing that much flame retardant may not be optimal.

The $M_2OSb_2O_3$ flame retardant synergist is preferably the sodium or potassium salt, i.e., M is Na or K. This alkali metal antimonate has been found to provide the synergistic activity needed without being antagonistic to the brominated flame retardant under the processing conditions which would normally render $Sb_2O_3$ to be antagonistic. As a result, when using an antimonate of this invention, a higher processing temperature can be used. Generally, the antimonates can tolerate temperatures up to about 320°–330° C. without being antagonistic. As noted before, the ability to use a higher processing temperature improves the processing of the formulation. The higher temperatures will decrease the viscosity of the formulation during processing thereby decreasing molding or extrusion times. Also, the lower viscosity enables the high quality and consistent formation of intricate articles having fine features.

The amount of antimonate flame retardant synergist used in the formulations of this invention is that synergistic amount which, in conjunction with the brominated flame retardant, gives the desired level of flame retardancy as measure by UL 94. For most brominated flame retardants of this invention, synergistic amounts within the range of from about 3 to about 8 wt % are suitable. The wt % is based upon the total weight of the formulation. Most preferred are amounts within the range of from about 4 to about 7 wt %, with 5 to 6 wt % being most highly preferred.

As described above, the brominated flame retardant and the alkali metal antimonate synergist co-operate one with the other to yield the desired degree of flame retardancy. The formulator, in selecting the respective amounts of these two ingredients, must balance the cost of the synergist against the desire to minimize the amount of flame retardant used. Generally speaking, for the formulations of this invention, the flame retardant amounts will be within the range of from about 14 to about 20 wt % and associated with the use of 4 to 6 wt % synergist. For the combination of the most preferred flame retardant, decabromodiphenyl ethane, and most preferred synergist, sodium antimonate, the former is preferably used in an amount of about 17–19 wt % and the latter in an amount of about 4–6 wt %.

It has been discovered that even higher processing temperatures can be used if the formulation, in addition to containing the polyamide, brominated flame retardant and antimonate synergist, also contained hydrotalcite. The term hydrotalcite is meant to cover both the natural and the synthetic species. Naturally occurring hydrotalcite is reported to have the formula $Mg_6Al_2(OH)_{16}CO_3 \cdot 4H_2O$, while synthetic hydrotalcite is reported to have the formula $Mg_{4.5}Al_2(OH)_{13}CO_3 \cdot 3.5H_2O$. There are calcined versions of hydrotalcite in which the water content and, in some cases, the OH and/or $CO_3$ contents are reduced or even eliminated. Also, In addition, hydrotalcites may feature a metal replacement of one of the Mg moieties, such as by Zn. Synthetic hydrotalcites can be obtained from Kyowa Chemical Industry Co., Ltd, Osaka, Japan. A particularly preferred hydrotalcite is Kyowa's DHT- 4A, which Kyowa reports to have the formula $Mg_4Al_2(OH)_{12}CO_3 \cdot 3H_2O$, but which is also reported to have the formula $Mg_{4.5}Al_2(OH)_{13}CO_3 \cdot 3.5H_2O$.

The presence of hydrotalcite in the formulations of this invention has been found to enable the use of high processing temperatures, e.g., up to about 330° C., without any significant degradation of the polymer. Further, the presence of hydrotalcite does not adversely affect the flame retardancy of articles made from the formulation.

The amount of hydrotalcite used will be within the range of from about 0.05 to about 2 wt %. More can be used, but such use has not demonstrated any significant advantage. Preferred amounts are from about 0.5 to about 1.5 wt %. As in all of the other cases, all wt %'s are based upon the total weight of the formulation. Note that the maximum amount of polyamide described for use in the formulations of this invention, i.e., 85 wt %, must be reduced in accordance with the amount of hydrotalcite used.

In addition to the polyamide, flame retardant, flame retardant synergist, and optional hydrotalcite, the formulations of this invention may contain other conventional additives in their respective conventional amounts. Exemplary of such additives are: fillers, pigments, UV stabilizers, antioxidants, processing aids and the like.

All of the constituents of the formulations of this invention can be blended one with the other in any conventional manner and in any order. Generally, the constituents are dry mixed with one another and then fed to a blender, such as a Banbury mixer or twin screw extruder. Blending temperatures will be within the range of from about 250° C. to about 340° C.

The blended material is suitable for feed to an article forming process, such as injection molding or extrusion. Conventional injection molding and extrusion techniques use a cylinder temperature within the range of from about 185° to about 250° C. and, for injection molding, a mold temperature below about 70° C.

The following Examples illustrate the principles of this invention.

EXAMPLES

DSC (differential scanning calorimeter) plots were obtained for three different formulations. The apparatus used was a Perkin-Elmer 7 Series Thermal Analysis System. The onset and peak temperatures are reported in the following Table and were obtained from the DSC plot of Heat Flow vs. Temperature.

The polyamide used in each of the formulations was AKULON S223-G6, a polyamide 6,6/30% glass filled resin from DSM Kunststoffen B. V. The flame retardant was Albemarle Corporation's S 8010™ decabromodiphenyl ethane. The hydrotalcite was DHT 4A2 from Kyowa Chemical Industry Co., Ltd.

All Examples obtained a V-0 rating when tested in accordance with the UL-94 test which is an Underwriters Laboratories, Inc. test entitled "Tests for Flammability of Plastic Materials for Parts in Devices and Appliances".

TABLE I

| Example No. | PA[1] | S 8010 | SA[2] | DHT-4A2 | Sb$_2$O$_3$ | Onset Temp. °C. | Peak Temp. °C. |
|---|---|---|---|---|---|---|---|
| 1 | 77 wt % | 18 wt % | | | 5 wt % | 303.6 | 312.6 |
| 2 | 77 wt % | 18 wt % | 5 wt % | | | 323.1 | 329.1 |
| 3 | 76 wt % | 18 wt % | 5 wt % | 1 wt % | | 330.0 | 335.9 |

[1] Akulon S 223-G6
[2] Sodium antimonate

We claim:

1. A composition consisting essentially of:
   (a) at least 50 wt % polyamide;
   (b) optionally, polyamide reinforcing material;
   (c) a flame retardant amount of a flame retardant selected from, decabromodiphenyl oxide, decabromodiphenyl ethane, decabromodiphenyl methane, hexabromodixylyl ethane, octabromoditolyl ethane, N,N'-ethylene bis(tetrabromophthalimide), N,N-bis(tetrabromophthalimide), tetradecabromodiphenoxybenzene, brominated 1,1,3-trimethyl-3-phenyl indan, brominated 1-phenyl-3-phenyl indan, and mixtures of any two or more of the foregoing;
   (d) a synergistic amount of M$_2$OSb$_2$O$_3$ wherein M is an alkali metal radical, and
   (e) an additive selected from the group consisting of fillers, pigments, UV stabilizers, antioxidants, processing aids and combinations of any two or more of the foregoing, said composition being characterized in that it will not experience thermal degradation before reaching a processing temperature of 320° C.

2. The composition of claim 1 wherein the polyamide is nylon 6, nylon 6,6 or a mixture thereof.

3. The composition of claim 1 wherein M is either Na or K.

4. The composition of claim 1 wherein the brominated flame retardant is decabromodiphenyl ethane.

5. The composition of claim 4 wherein the polyamide is nylon 6, nylon 6,6 or a mixture thereof.

6. The composition of claim 5 wherein the polyamide is present in an amount which is within the range of from about 60 to about 85 wt %.

7. The composition of claim 5 wherein the decabromodiphenyl ethane is present in an amount within the range of from about 12 to about 25 wt %.

8. The composition of claim 5 wherein the M$_2$OSb$_2$O$_3$ is present in an amount within the range of from about 3 to about 8 wt %.

9. The composition of claim 1 wherein the polyamide is nylon 6, nylon 6,6 or a mixture thereof and is present in an amount within the range of from about 60 to about 85 wt %, the brominated flame retardant is decabromodiphenyl ethane and is present in an amount within the range of from about 12 to about 25 wt % and the M$_2$OSb$_2$O$_3$ is sodium antimonate and is present in an amount within the range of from about 3 to about 8 wt %.

* * * * *